United States Patent [19]
Tu

[11] Patent Number: 6,014,606
[45] Date of Patent: Jan. 11, 2000

[54] COCKPIT WEATHER INFORMATION SYSTEM

[75] Inventor: Jeffrey Chen-Yu Tu, Cerritos, Calif.

[73] Assignee: McDonnell Douglas Corporation, Huntington Beach, Calif.

[21] Appl. No.: 08/736,977

[22] Filed: Oct. 25, 1996

[51] Int. Cl.[7] ........................................... G06F 15/50
[52] U.S. Cl. ................................. 701/200; 342/26
[58] Field of Search .................. 701/200; 702/3; 73/178 R; 342/26, 460; 434/217; 455/505; 706/931

[56] References Cited

U.S. PATENT DOCUMENTS

| | | | |
|---|---|---|---|
| 4,642,775 | 2/1987 | Cline et al. | 701/200 |
| 5,265,024 | 11/1993 | Crabill et al. | 364/443 |
| 5,614,907 | 3/1997 | Kretmair-Steck et al. | 342/25 |
| 5,657,009 | 8/1997 | Gordon | 340/968 |
| 5,714,948 | 2/1998 | Farmakis et al. | 340/961 |
| 5,757,322 | 5/1998 | Ray et al. | 342/460 |
| 5,793,813 | 8/1998 | Cleave | 375/259 |

Primary Examiner—William A. Cuchlinski, Jr.
Assistant Examiner—Arthur D. Donnelly
Attorney, Agent, or Firm—Alston & Bird LLP

[57] ABSTRACT

Weather information, periodically collected from throughout a global region, is periodically assimilated and compiled at a central source and sent via a high speed data link to a satellite communication service, such as COMSAT. That communication service converts the compiled weather information to GSDB format, and transmits the GSDB encoded information to an orbiting broadcast satellite, INMARSAT, transmitting the information at a data rate of no less than 10.5 kilobits per second. The INMARSAT satellite receives that data over its P-channel and rebroadcasts the GDSB encoded weather information, in the microwave L-band, throughout the global region at a rate of no less than 10.5 KB/S. The transmission is received aboard an aircraft by means of an onboard SATCOM receiver and the output is furnished to a weather information processor. A touch sensitive liquid crystal panel display allows the pilot to select the weather function by touching a predefined icon overlain on the display's surface and in response a color graphic display of the weather is displayed for the pilot.

4 Claims, 2 Drawing Sheets

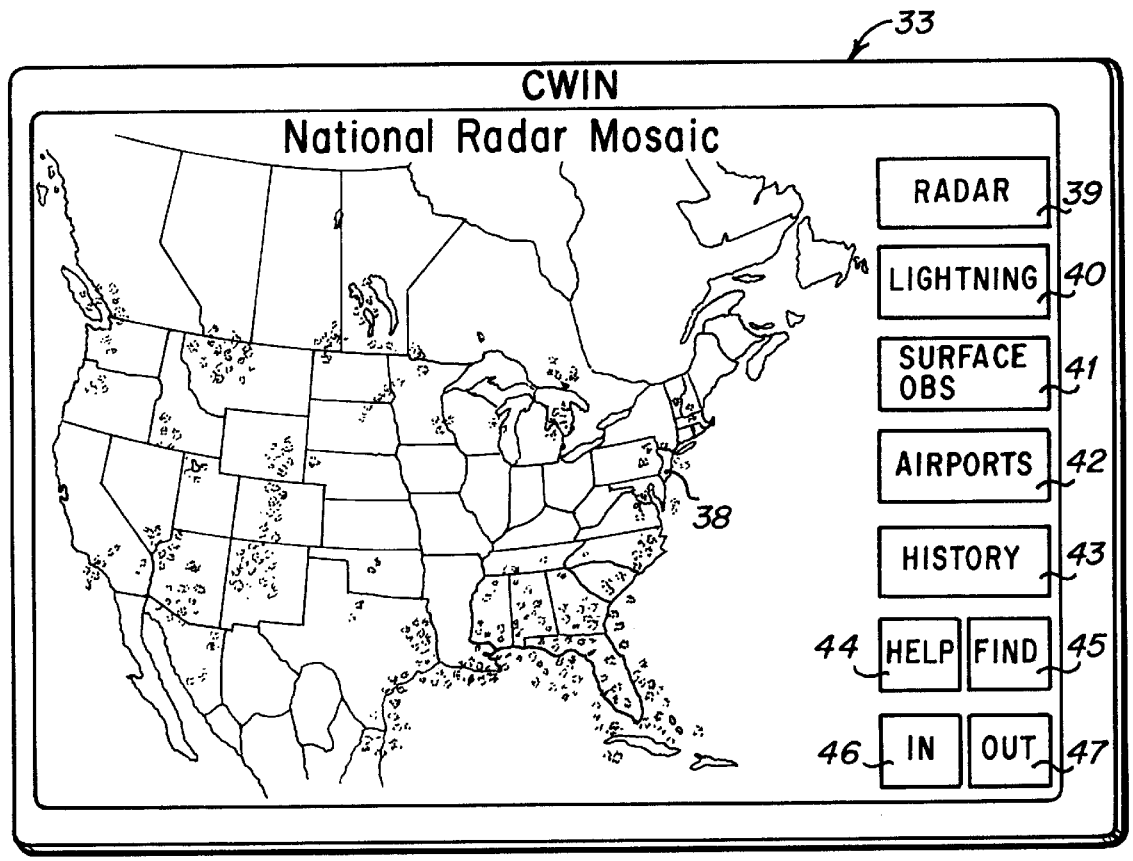
Fig_4
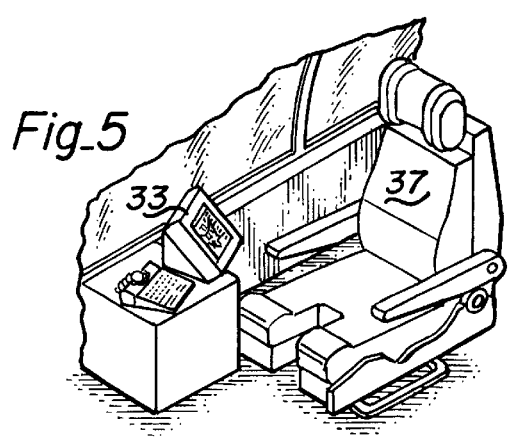
Fig_5

COCKPIT WEATHER INFORMATION SYSTEM

GOVERNMENT LICENSE RIGHTS

This invention was made under Contract No. NAS1-19703 awarded by NASA. The Government has certain rights in this invention.

FIELD OF THE INVENTION

This invention relates to graphical weather displays and, more particularly, to a new system for graphically displaying current global weather information within an aircraft's cockpit during flight. The system makes available convenient moving maps showing current geographic weather conditions and allows pilots to avoid adverse weather along the flight route.

BACKGROUND

At present aircraft pilots have difficulty obtaining pertinent weather information in-flight in a timely manner as would allow them to accurately detect a weather trend along the flight route and avoid inclement weather. As example, given weather information and weather maps at the airport prior to departure from, say, New York City, and the weather along the route and at the intended termination, say, Los Angeles, one anticipates that during a flight of many hours duration, the weather along the flight route and at the intended destination could change adversely. The pilot may learn of those weather changes in route by disjointed weather information sources, which provides incomplete weather information at best. As example, communication with ground crew, textual weather information sent by ACARS, only available to airlines and transports, and on-board weather radar.

More advanced aircraft are equipped with weather radar systems that allow view of oncoming weather over a range of one hundred and fifty miles or so, which gives the pilot some welcome, but limited, information. As example, by altering course to avoid a forthcoming storm front shown on the weather radar monitor in the aircraft's current path of flight, the pilot may find only too late that the new route selected takes his airplane into the path of an even larger storm two hundred miles away. The pilot might then gamble and retrace the flight to the original route or undertake another like guess. The lack of readily available up to date global information handicaps the pilot's situation awareness, makes re-routing decisions difficult and frustrating, and results in close encounters with adverse weather.

Encountering bad weather thus exacts a toll not only on the pilot, but also on the airline's passengers who may fear for their personal safety. It also drives up fuel costs, adversely affecting the airlines. As the pilot may re-route the craft too and fro on the basis of imprecise and limited information intending to avoid bad weather, extra fuel is consumed.

Inadequate weather dissemination capability of fixed weather stations has always been a concern to both government and the airlines. Inadequate and unreliable deployable weather equipment often fails to disseminate weather information quickly and effectively. Consequently, flight safety is adversely affected.

The concept of transmitting weather information to the cockpit by satellite has been discussed in various forums in the past several years and even appears in the patent literature. As example, U.S. Pat. No. 5,265,024, to Crabill et al, granted Nov. 23, 1993 describes a concept that is consistent with the present invention's philosophy of furnishing ground based weather information to aircraft in flight through the intermediary of a broadcast satellite. The patent describes the type of weather data in great detail, but does not describe the approach to technology implementation. The patent fails to identify the type of satellite, the broadcast data communication protocol, broadcast channel and data transmission rate, and does not describe how the airborne hardware integration with the SATCOM receiver is accomplished to support a high data transmission rate. The patent describes what the system is supposed to do, but it does not provide sufficient detail allow one to place the system into practice.

One also appreciates that at least one aircraft ground simulator, which helps to train pilots, includes presentation of weather maps. However, that is a simulation, and differs from actual practice in obtaining such kind of current weather information within an aircraft in flight. Such ground simulator offers another example of the strong existing desire to have current weather information available on maps on board aircraft on demand for the pilot and confidence that a practical implementation will soon be discovered.

Until the present invention, thus, no one transformed the concept to a reality and the concept remained a long sought after goal, awaiting the practical implementation, which the present invention provides. To attain that goal, the present invention takes advantage of the existing capabilities of today's aeronautical satellites, present SATCOM receivers, and computer chips and displays presently used with personal computers.

One practical impediment to implementation of a graphical weather display system is cost. If new components must be constructed, tested and developed over long periods to ensure reliability and airworthiness, the cost of the equipment is usually high and, importantly, its implementation encounters long delays.

Advantageously, the present invention makes use of components, equipment and services that are available essentially off-the-shelf. Implementation requires writing of few new software programs for graphics display and processing, which are seen as routine and uncomplicated. No long term development is necessary. It is appreciated that considerable savings are to be realized by using off-the-shelf hardware and software and the system may be rapidly implemented avoiding long delays.

Accordingly, an object of the present invention, is to provide an in cockpit graphical weather system that supplies relatively current weather information for in-flight pilot utilization.

And a further object of the invention is to provide a system for providing pilot's near real time in-flight weather information in graphical form constructed from commercial off-the-shelf systems.

SUMMARY OF THE INVENTION

The present invention makes weather information available to pilots in-flight on demand giving the pilot essentially contemporaneously weather information displayed in an easy to understand graphical format on an active matrix color liquid crystal display with a touch-screen overlay for inputting the pilot's selections.

Applicant discovered the availability of the P-channel, packet channel, contained in the INMARSAT broadcast satellite and its suitability for high speed data reception at rates of 10.5 kilobits per second. It has also discovered that the existing Aircraft Communications Addressing and Reporting System (ACARS), through which the output of the aircraft's SATCOM receiver is passed in flight communications systems, can be by-passed, and sent directly to a weather information computer system.

Based on the foregoing observations, weather information collected from throughout a global region is assimilated at a central source. That weather data compilation is sent from that central source via a high speed data link to a satellite communication service, such as the well known COMSAT, and that service converts the data to Ground Earth Station Specific Data Broadcast format (GSDB). From the COMSAT station the GSDB formatted data is transmitted at a data rate of 10.5 kilobits per second to a broadcast satellite, such as the current INMARSAT satellite. The INMARSAT satellite receives that data over its P-channel and continuously rebroadcasts the GSDB encoded weather information via that P channel, in the microwave L-band, throughout the global region. The broadcast of that weather data is continuous. New weather information data is obtained and up-linked periodically over short time intervals, suitably every fifteen minutes, and replaces the prior weather information in the broadcast.

Aircraft flying in that global region receive the high speed data transmission over an onboard SATCOM receiver and the output is furnished to a weather information processor, which is implemented with airworthy commercial off-the-shelf processors, such as an Intel 486 or PENTIUM processor. The weather information processor provides output to a touch sensitive liquid crystal panel display, which allows the pilot to select the weather functions and observe the weather in the region by viewing a color graphic display of the weather.

The weather information processor constructs the graphical displays, moves weather displays, color textual displays, and user interface functionality, such as a touch selector switch. The information is color coded to distinguish degrees of severity for ground radar summaries, ground lightning strikes, and degrees of category for surface observations and terminal forecasts. The system is capable of providing near real-time ground/on-board international airports, weather radar data, ground lighting strike map, surface observation and terminal forecast for all domestic and warning images, all with a flight plan overlay.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 4 is a front layout of the pilot's flat display panel used with the system of FIG. 3; and FIG. 5 is a pictorial of the pilot's station including the pilot's display panel.

DETAILED DESCRIPTION OF THE PREFERRED EMBODIMENTS

Figure 1:
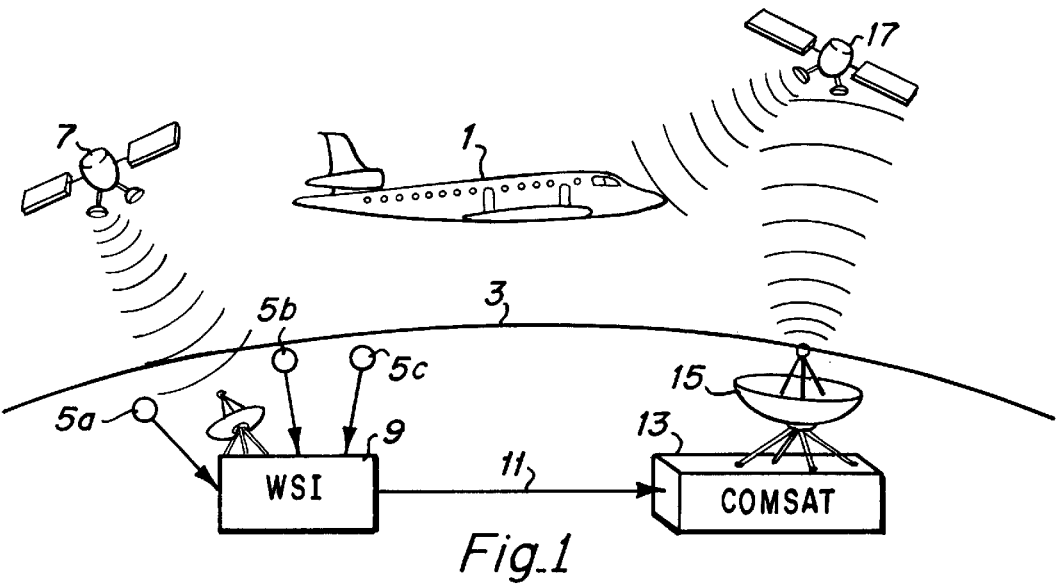
FIG. 1 is a block diagram of the overall system.

Reference is made to FIG. 1, which illustrates a block diagram of the new weather information system in operation with an aircraft 1 in flight over a global region 3. As used herein, the term global region is intended to cover a large geographic area, such as at least a country the size of the continental United States. In more expansive improved implementations of the data collection portions of the system, hereafter described, the term would also apply to larger regions of the earth and even to the entire Earth.

Weather information from about the global region 3 is periodically collected at a central Weather Service Information site 9 from various weather information collection sources, such as a large number of ground sources 5a, 5b, and 5d, approximately one-hundred and seventy in the continental United States alone, and/or from a weather satellite 7. That data contains information on the coordinates of locations of rain and lightning, separately identified.

Such a central source of weather data presently exists as a business, and makes the data available for a reasonable fee. The WSI 9 essentially serves as an off-the-shelf component that, like other available components, minimizes the investment necessary to implement the present system and also avoids the need to concern oneself with the details of such data collection. At the WSI, the data is compiled and stored on computer, ready for transmission elsewhere.

The compiled weather data is then sent via a high speed data line 11, such as a data or ISDN line leased from a telephone company, at a high data rate, suitably 10.5 KB/sec or greater, to a Ground Earth satellite transmitting station 13, such as the well known COMSAT system. At COMSAT, the compiled weather data is converted into the GSDB format using appropriate software conversion programs and techniques.

As recognized by those skilled in the art, GSDB stands for GES Specific Data Broadcast or Ground Earth Station Specific Data Broadcast protocol, a particular bit format of the data stream known to practioners in the field that is used by both sender and receiver. It is a specific protocol that is used exclusively by aeronautical satellites, such as the INMARSAT satellites, to perform broadcast data transmission. The GSDB protocol allows sender and receiver to be in synchronism on the data format to ensure proper transmission and reception. This also is known technology. Those wishing to learn further details for same may make reference to the technical literature.

In the next step, the ground earth satellite transmitting station at COMSAT up-links, transmits that GSDB formatted data over the "P" channel, at a high data rate, of 10.5 Kb/sec., via its transmitter 15 to a broadcast satellite 17, such as the INMARSAT satellite, or other satellite system of no less capability, having suitable broadcast coverage over the global region.

Broadcast satellite 17 then retransmits that GSDB encoded data at a high data rate, no less than 10.5 Kb/sec., over the area of its coverage or broadcast "footprint", the global region 3. A single satellite such as INMARSAT has coverage over the continental United States. The broadcast signals are available to all stations in that field of coverage that are equipped with a SATCOM receiver, whether the receiver is in the air or on the ground or on water, including aircraft 1, shown in flight in FIG. 1.

The high speed transmitting channel from the Ground Earth Station (GES) COMSAT to the INMARSAT satellite, and also the channel over which the satellite broadcasts that data, is called P channel. This channel is in the L-band frequency range, which is at about 1.53 Ghz to 1.559 GHz. The speed of data transmission over the P channel is 10.5 Kilobits per second. The data is sent at that rate from the GES to the satellite and by the satellite to the aircraft within the covered broadcast region.

The formatted weather data may be continuously retransmitted to the satellite and re-broadcast by the satellite and continuously repetitiously re-broadcast by the satellite.

The foregoing process of collecting, compiling and sending the pertinent data to the satellite is continued repeatedly. This assures that the pilot has access to the most current weather information available, essentially near real time information no less than fifteen minutes old.

Figure 2:
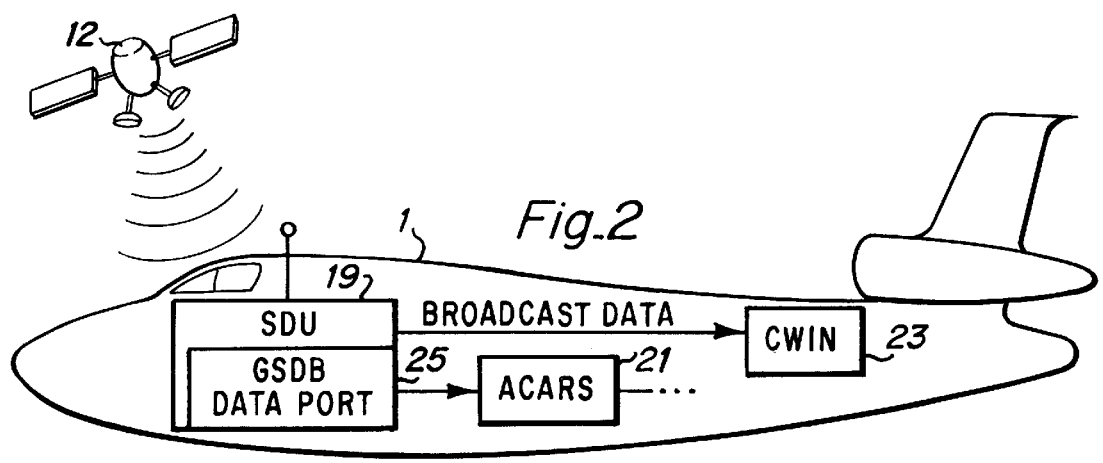
FIG. 2 is a simplified block diagram of the on-board components of the system.

Turning to FIG. 2, a simplified block diagram of aircraft 1 and its on-board equipment is presented. The aircraft contains a SATCOM receiver, referred to as the Satellite Data Unit (SDU)19 and a conventional ACARS 21, through which the output of the SDU passes in conventional satellite communications systems presently employed in aircraft. In this system the ACARS is by-passed and a direct connection is made from the SDU to the weather information system processor 23, CWIN, via GSDB data port 25. SDU 19 receives the broadcast data from Inmarsat satellite 17 and outputs the data from GSDB port 25.

Although by-passed in this system the ACARS remains operative in use with other equipment aboard the aircraft, as represented by the dotted output line. Those functions, however, are not relevant to the present invention and need not be discussed.

Figure 3:
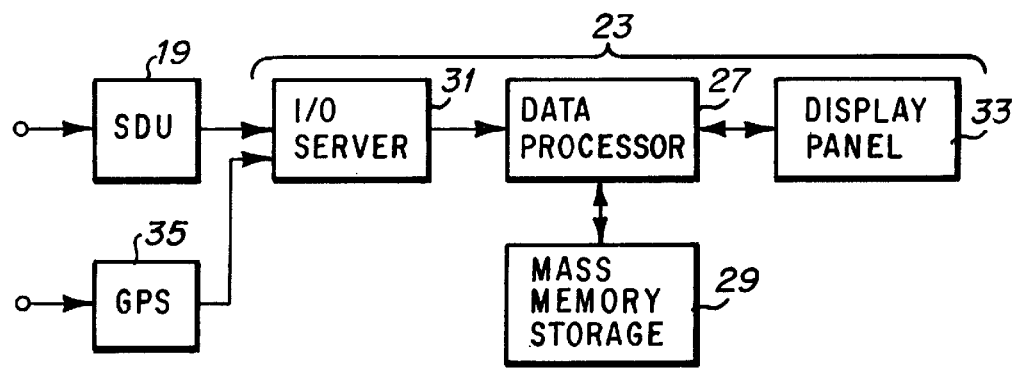
FIG. 3 is a block diagram of the electronic processing system on board the aircraft.

The weather information system processor 23 CWIN is illustrated in block diagram in FIG. 3, to which reference is made. This includes a digital processor 27, a mass memory storage 29, an input output server 31, and a liquid crystal type touch sensitive display 33. Data processor 27 may be a reliable high speed computing platform that meets the requirements for airborne applications, which employs a conventional INTEL PENTIUM processor chip, and contains a conventional operating system, such as the WINDOWS 95 operating system, which because of its mass availability is low in cost relative to conventional aircraft electronics equipment. The computer is akin to those marketed by the HEWLETT PACKARD company for ground based operation, that has been ruggedized and otherwise equipped for airborne application. Mass storage 29 may be formed of a magnetic disk capable of holding at least two gigabytes of data. And input output server 31 may be a commercial personal computer with specific hardware interface modules.

As illustrated, GSDB formatted data is received by SDU 19 and supplied thereby, suitably by an Aeronautical Radio Inc. (ARINC) 429 interface to an input of Input output server 31. The ARINC 429 is a widely used commercial interface protocol standard for commercial avionics system interface. Other inputs may also be applied to that server from other electronic equipment onboard the aircraft, particularly from the GPS positioning system 35 also via an ARINC 429 interface, which provides information of the aircraft's position and allows the aircraft and its flight plan to be overlain on the displayed map.

Display 33 is provided by a 10.4 inch touch sensitive color liquid crystal panel display, such as is available in the market place for use with personal computers and workstations. The configuration of the display panel is illustrated in FIG. 4. As there illustrated many icons are generated by the computer, based upon the appropriate data stored in memory, and are graphically overlain upon and displayed on the surface of the display panel of a touch sensitive active matrix color liquid crystal display. As illustrated, these icons, which serve as selector buttons, and their meaning are as follows: RADAR, 39, selects the radar mosaic images; LIGHTNING, 40, selects the images of lightning; SURFACE OBS, 41, provides temperature, visibility ceiling, precipitation, dew point and the like for a specific airport; AIRPORTS, 42, displays the three letter code for the airport when touched by the pilot; HISTORY, 43, shows the six previously received maps of weather data, which allows the pilot to visualize a weather trend; HELP, 44, shows a definition of the surface observation symbol displayed when the "surface obs" icon is touched; FIND, 45, allows the pilot to find an airport's surface observations by selecting an airport from an alphabetical listing; IN, 46, allows one to zoom in on the image; and OUT, 47, allows one to zoom out on the image.

Each icon displayed occupies a portion of the surface. When the user touches a particular icon on the display screen, the computer determines that the weather map of the global region, here the United States, is being requested and outputs the pertinent map and information for location on that map from memory to the display. The map 38 is displayed and all instances of rain within that region are displayed. As illustrated in FIG. 5, the display panel 33 is conveniently located along side the pilot's chair 37 for easy access.

Appropriate software for coordinating with the display and displaying all graphic data is elementary, and is essentially the same as found in prior systems. In essence, a map data is stored within the mass memory, along with the weather information data, GPS positioning information and routing information. When called upon to display the weather, the map is displayed and the weather data is simultaneously displayed overlying the displayed map. That procedure is conventional and minimizes the need to transmit map graphics of the global region which remains constant from the central source WSI, along with the weather information. And the software permits individual areas within the global region to be displayed by zooming in on a particular coordinate. Map display software and zoom features are familiar to even the lay person who runs one of the commercially available map programs on a personal computer.

Further, the computer stores data from earlier supplied weather information, sufficient to produce four separate maps, and empties old information from the mass memory on a first in first-out basis as a new map is being stored. Should the pilot touch the HISTORY icon, the computer supplies in sequence at short time intervals a succession of displays, in consecutive order to the present the weather maps of the pertinent region selected. This provides an animated display. The foregoing allows the pilot to assess the way in which the weather along the route is changing and to select the best flight course for the continuing journey, based on the pilot's judgement and experience.

Should the pilot wish to learn of those regions experiencing lightning, the pilot touches the LIGHTNING icon, and a map graphically pin pointing the lightning locations comes into view on the display.

Should it be desired to expand the described system to greater areas of the globe, either to collect weather information from a greater number of regions, or to disseminate the weather information over a greater sized region or, preferably, to do both, since the weather information is most useful to those flying or expecting to fly within a region, then additional linked broadcast satellites may be used, which relay the information from the one to the others, and additional weather satellites may pick up and communicate the weather information to the WSI 9.

In the past, add-on electronic systems, such as the present system, were unable to receive data directly from the satellite receiver or SDU on board the aircraft. The received signals were required to pass through another electronic system, referred to as ACARS, Aircraft Communications Addressing and Reporting System. It is appreciated that the present system bypasses the ACARS. By bypassing ACARS and directly communicating with the SDU through the GSDB data port allowing the high data transmission rates are achieved.

No complicated devices are required. The components to the system are presently available in the marketplace. All that is required is simple programming skills to formulate the graphic displays and control the computer.

Given an understanding of the foregoing invention and viewing same against the examples of prior in-flight weather display systems, the additional ingredients presented herein to make the weather information system a practical reality may appear minor. Yet despite the long felt need for the weather display system and the long availability of the principal components and many ideas, the invention remained unobvious.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A system for providing a pilot of an aircraft in flight over a global region with near real time weather information in graphic form in respect of the global region, the system comprising:

central weather data collection and compiling means for periodically collecting and compiling at a first ground based location weather information throughout the global region from a plurality of weather information data collection sources;

a ground based satellite communication service for receiving the compiled weather information from said central weather data collection and compiling means, said ground based satellite communication service including:

ground to satellite transmitting means for transmitting said weather information from said ground based satellite communication service;

broadcast satellite means including receiving means for receiving said weather information from said ground to satellite transmitting means, amplifying means for amplifying received signals, and transmitting means for broadcasting said weather information throughout said global region;

satellite communication receiver means on said aircraft for receiving said satellite broadcast of weather information within the aircraft;

weather information processor means within said aircraft for converting said weather information into specific weather map and pictorial depictions; said weather information processor means including input output server means, coupled to said satellite communication receiver means and to a global positioning system receiver, said input output server means for receiving said weather information from said satellite communication receiver means and global position information from said global positioning system receiver;

mass memory means for storing at least said weather information and map information of said global region; and color liquid crystal panel display means coupled to said weather information processor means for providing a display of graphical information, including a map of at least a portion of said global region and, simultaneously, a depiction of various weather information at the coordinate locations on said map prescribed in said weather information, and pilot selectable display functions;

said color liquid crystal panel display means including a touch responsive surface switching means for enabling pilot selection of individual functions for performance by said weather information processor means, including the function of outputting weather information to said color liquid crystal display means, wherein said touch responsive surface switching means comprises an overlay display of the individual functions including a plurality of icons associated with respective functions and graphically represented by said liquid crystal panel display means, and wherein said overlay display includes first icon means for selection of RADAR to provide radar mosaic images, second icon means for selection of the images of lightning; third icon means for selection of weather conditions at a selected airport; fourth icon means for selection of a code for the airport selected; fifth icon means for showing previously received maps of weather data; sixth icon means for display of a definition of the surface observation symbol displayed subsequent to selection of said third icon means; seventh icon means for selecting an airport from a listing; eighth icon means for displaying a smaller geographic region than the region on display; and ninth icon means for displaying a larger geographic region than the region on display, said weather information processor means further including display control means for outputting display information to said color liquid crystal panel display means based upon the function associated with the icon touched by the pilot.

2. The invention as defined in claim 3 wherein said weather information processor means comprises a high speed personal computer.

3. The method of acquiring and displaying to an aircraft pilot in-flight weather information covering a global region during flight within said global region, comprising the steps of:

acquiring weather information periodically from a plurality of sources dispersed throughout the global region at a first acquisition location, and transmitting said weather information to a ground based satellite communication service;

transmitting said weather information from said ground based satellite communication service to a satellite in orbit over said global region;

receiving said weather information in said satellite and amplifying and re-transmitting said weather information throughout said global region;

receiving said satellite broadcast within the aircraft;

storing said encoded weather information in a mass memory;

providing a color liquid crystal display including a touch screen overlay having a first icon for selection of RADAR to provide radar mosaic images, a second icon for selection of the images of lightning; a third icon for selection of weather conditions at a selected airport; a fourth icon for selection of a code for the airport selected; a fifth icon for showing previously received maps of weather data; a sixth icon for display of a definition of the surface observation symbol displayed subsequent to selection of the third icon; a seventh icon for selecting an airport from a listing; an eighth icon for displaying a smaller geographic region than the region on display; and a ninth icon for displaying a larger geographic region than the region on display;

detecting pilot selection of a display function by touching the icon associated with the selected display function; and displaying said weather information in graphical form upon the flat panel color liquid crystal display in accordance with the display function selected by the pilot.

4. The method as defined in claim 3, in which said aircraft contains an ACARS unit, and a Satcom SDU, and said Satcom SDU contains a GSDB data port, and wherein said step of receiving said satellite broadcast within the aircraft at a high data speed rate of no less than 10.5 kilobits per second and inputting said GSDB encoded weather information directly into an input-output server for a weather processor means, includes the step of receiving said satellite broadcast from said GSDB data port, by passing said ACARS unit.

* * * * *

UNITED STATES PATENT AND TRADEMARK OFFICE
CERTIFICATE OF CORRECTION

PATENT NO. : 6,014,606
DATED : January 11, 2000
INVENTOR(S) : Tu

It is certified that error appears in the above-identified patent and that said Letters Patent is hereby corrected as shown below:

Title page: insert the following:
[60] Provisional application 60/027,824 filed Oct. 7, 1996,--.

Column 1, line 4, insert the following:
--CROSS REFERENCE TO RELATED APPLICATION
Reference is made to and priority claimed from U.S. provisional application Ser. No. 60/027,824, filed Oct. 7, 1996, "COCKPIT WEATHER INFORMATION SYSTEM".

Column 8, line 53, "claim 3" should read --claim 1--.

Column 10, cancel lines 12-14; line 15, cancel "processor means,"; line 16, after "broadcast" insert --directly--.

Signed and Sealed this

Twenty-sixth Day of December, 2000

Attest:

Q. TODD DICKINSON

Attesting Officer

Director of Patents and Trademarks.